(12) United States Patent
Banin et al.

(10) Patent No.: US 9,374,676 B1
(45) Date of Patent: Jun. 21, 2016

(54) MOBILE COMMUNICATION STATION HAVING SELECTABLE POSITION LATENCY FOR POSITION ESTIMATION IN A WIRELESS NETWORK

(71) Applicant: Intel Corporation, Santa Clara, CA (US)

(72) Inventors: Leor Banin, Petach Tikva (IL); Yuval Amizur, Kfar-Saba (IL); Uri Schatzberg, kiryat ono (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/577,988

(22) Filed: Dec. 19, 2014

(51) Int. Cl.
| | |
|---|---|
| *H04W 24/00* | (2009.01) |
| *H04W 4/04* | (2009.01) |
| *H04W 4/02* | (2009.01) |
| *H04W 64/00* | (2009.01) |

(52) U.S. Cl.
CPC .......... *H04W 4/04* (2013.01); *H04W 4/02* (2013.01); *H04W 4/021* (2013.01); *H04W 64/00* (2013.01)

(58) Field of Classification Search
CPC ......... H04W 4/02; H04W 4/04; H04W 4/021; H04W 64/00
USPC .............. 455/456.1, 456.3, 418, 404.2, 550.1
See application file for complete search history.

(56) References Cited

U.S. PATENT DOCUMENTS

| | | | | | |
|---|---|---|---|---|---|
| 6,952,181 | B2* | 10/2005 | Karr | ..................... | G01C 21/206 342/450 |
| 2010/0190509 | A1* | 7/2010 | Davis | .................. | H04W 56/006 455/456.1 |
| 2011/0117924 | A1* | 5/2011 | Brunner | ................ | G01S 5/0252 455/456.1 |
| 2013/0273938 | A1* | 10/2013 | Ng | ........................ | H04W 64/00 455/456.1 |
| 2016/0029224 | A1* | 1/2016 | Edge | ..................... | G01S 5/0252 455/456.1 |

* cited by examiner

*Primary Examiner* — Khai M Nguyen
(74) *Attorney, Agent, or Firm* — Schwegman Lundberg & Woessner, P.A.

(57) ABSTRACT

Mobile communication stations (STA) and a method for position estimation in a wireless network having access points (APs) are disclosed. The STA is configured to perform position estimation operations, with respect to the APs, based on a position latency parameter, a rate parameter, a power parameter, and an accuracy parameter. An upper layer of the STA may send the parameters to a position provider that generates the position estimation measurements and transmits the results back to the upper layer wherein the results include the position of the STA prior to the present time and the length of time from the present time to the time that the STA was at that particular position.

18 Claims, 5 Drawing Sheets

MOBILE COMMUNICATION STATION HAVING SELECTABLE POSITION LATENCY FOR POSITION ESTIMATION IN A WIRELESS NETWORK

TECHNICAL FIELD

Embodiments pertain to wireless network communications. Some embodiments relate to the IEEE 802.11 standards. Some embodiments relate to wireless networks. Some embodiments relate to indoor positioning and indoor location. Some embodiments relate to geo-fencing and geo-logging. Some embodiments relate to time-of-flight (ToF) position estimation.

BACKGROUND

Outdoor navigation is widely deployed through the use of various global-navigation-satellite-systems (GNSS) such as the U.S. Global Positioning System (GPS), the Russian Global Navigation Satellite System (GLONASS), and the European GALILEO. These systems may operate effectively outdoors but, due to satellite reception problems, may not be very effective indoors.

Relatively recently, there has been a focus on solving indoor navigation problems. One solution may be based on Time-of-Flight (ToF) positioning methods. Time-of-Fight may be defined as the overall time a signal propagates from a mobile communication station (STA) (e.g., user) to an access point (AP) and back to the user. This value may then be converted into distance by dividing the time by two and multiplying the result by the speed of light. The position estimation may be performed periodically multiple times per second in order to provide an accurate position estimation. This method may be robust and scalable but may consume more power than is desirable, depending on the application.

There are general needs for performing indoor navigation while consuming less power.

DESCRIPTION OF EMBODIMENTS

Subsequently described embodiments refer to WiFi communication systems and Institute of Electrical and Electronics Engineers (IEEE) 802.11 (i.e., a set of physical layer standards for implementing wireless local area network (WLAN) computer communication). However, the present embodiments are not restricted to only a WiFi communication system or any particular communication standard. The present embodiments may be used in any communication system in which location and navigation capabilities may be desired.

ToF positioning methods may provide a way to determine a STA location in an environment where GNSS may not be available (e.g., indoors). APs typically have fixed antennas whose positions are known. Thus, a STA using ToF trilateration between multiple APs may generate a relatively accurate estimate of the STA's position. The ToF calculations may be used with any wireless technology including WiFi, Bluetooth and/or cellular.

The present disclosure is not limited to ToF calculations. Other embodiments may use other ways to estimate the STA position. For example, the STA position may be estimated by inertial sensors in the STA, a GPS receiver in the STA, magnetometers, barometers, and/or map data including street maps, indoor maps or combinations of any of these and other ways to estimate or determine a position. A position estimation/determination module (e.g., circuit) may include any one or more of these ways to estimate/determine the STA position. The module may be hardware, software, or a combination of hardware and software.

The position estimation may be performed between the STA and the APs one or more times per second. This results in the STA using its limited battery power to continuously update its position even when such a frequent update may not be necessary for the user and/or an applications being executed on the STA. The subsequently described embodiments include a position latency parameter, in addition to the power and accuracy parameters, when estimating the STA's position. Using the position latency parameter, the present embodiments provide a STA with higher accuracy of position estimation for the same power or the same accuracy of position estimation using less power.

As used herein, position latency may be defined as a time period between a time that a STA arrives at a position and a time when it performs a calculation to estimate its position.

Figure 1:
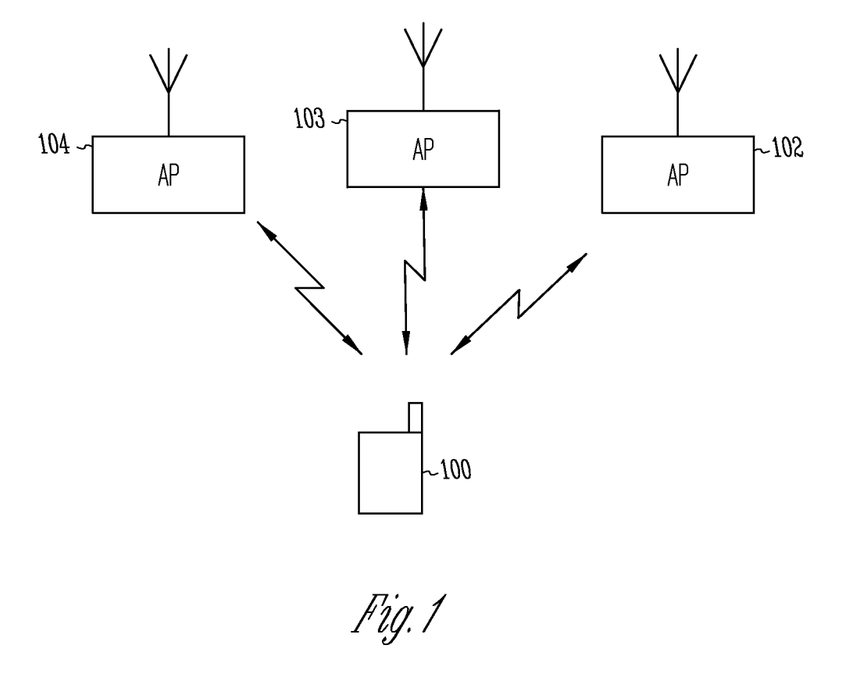
FIG. 1 illustrates a block diagram of an embodiment of a wireless communication system in accordance with some embodiments.

FIG. 1 illustrates a block diagram of an embodiment of a wireless communication system in accordance with some embodiments. The wireless communication system may include one or more wireless communication stations 100, 102-104 that may include a STA 100 and a plurality of access points (APs) 102-104 that may communicate over one or more wireless channels. For example, the APs 102-104 may communicate in accordance with IEEE 802.11 communication techniques.

The STA 100 may be a communication device that is non-stationary. Such a communication device may include mobile radiotelephones (e.g., cellular telephones), tablet computers, lap top computers, or other communication devices that may communicate with the access points 102-104 over one or more wireless channels using a communication technique (e.g., IEEE 802.11).

The access points 102-104 have fixed locations. The access points 102-104 may be part of a stationary network that may be coupled to a larger network (e.g., local area network (LAN), wide area network (WAN)). For example, the access points 102-104 may be part of a wired network that is coupled to the Internet. The STA 100 may then access the larger network by communicating over the wireless channels with the access points 102-104.

It may be desirable for the STA 100 to know its location with relation to the access points 102-104. Since the geographical locations of the access points 102-104 are fixed and known, the geographical location of the STA 100 may be determined by trilateration and tracked thereafter. The trilateration may be accomplished by using ToF calculations as described previously.

Figure 2:
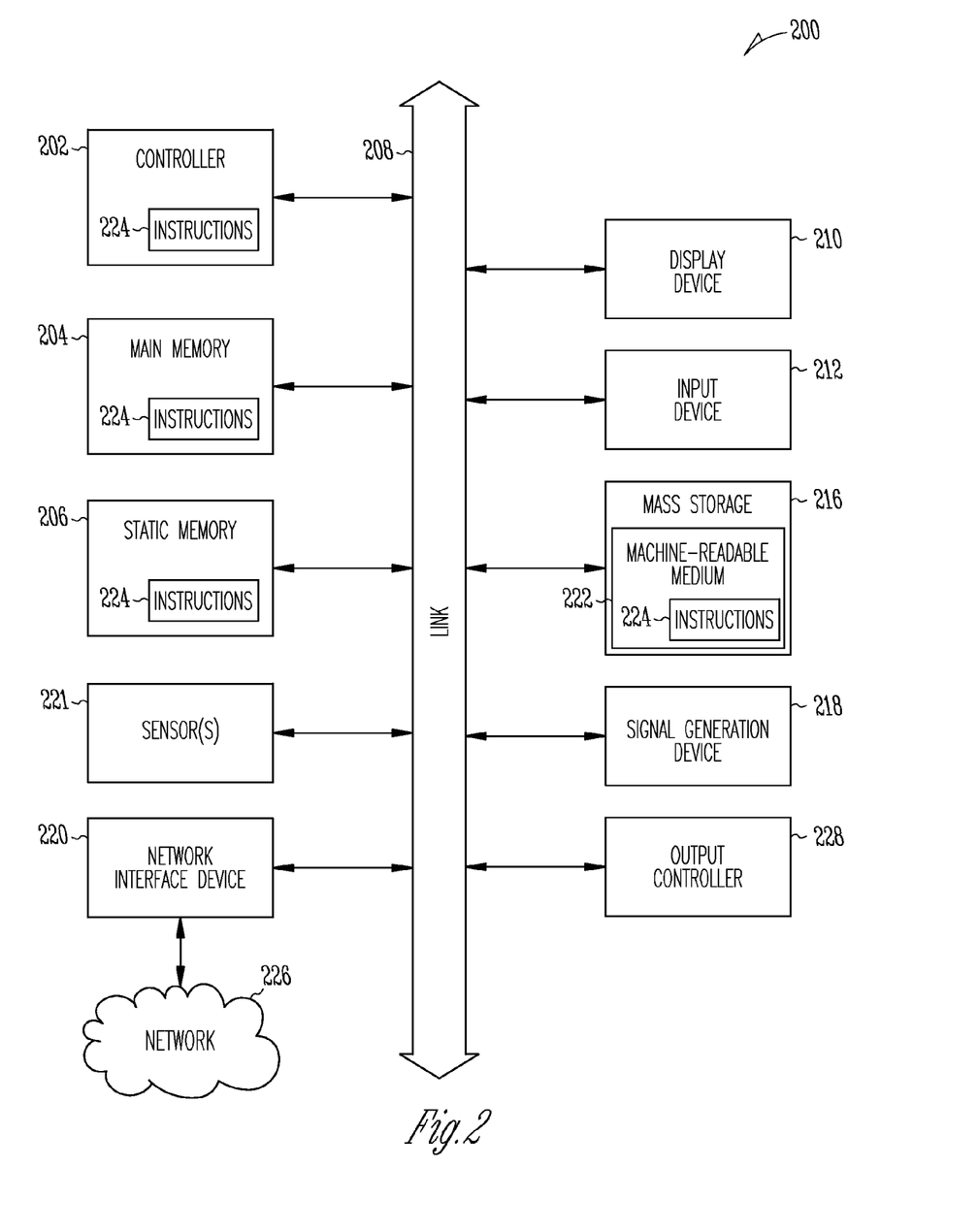
FIG. 2 illustrates a block diagram of an embodiment of a wireless communication station in accordance with some embodiments.

FIG. 2 is a block diagram illustrating a communication apparatus 200 in the example form of a STA, an AP, a cellular base station (e.g., eNodeB, eNB), or some other wireless station. For example, the communication apparatus 200 may be a computer, a personal computer (PC), a tablet PC, a hybrid tablet, a personal digital assistant (PDA), or part of any device configured to execute instructions (sequential or otherwise) that specify actions to be taken by the communication apparatus 200. The term "processor-based system" shall be taken to include any set of one or more communication apparatuses that are controlled by or operated by a processor (e.g., a computer) to individually or jointly execute instructions to perform any one or more of the methodologies discussed herein. A set or sequence of instructions may be executed to cause the communication apparatus to perform any one of the methodologies discussed herein, according to an example embodiment.

The communication apparatus 200 may include at least one controller 202 (e.g., a central processing unit (CPU), a graphics processing unit (GPU) or both, processor cores, compute nodes, etc.), a main memory 204 and a static memory 206 that communicate with each other via a link 208 (e.g., bus). The memory may be used for storing map data used herein. The communication apparatus 200 may further include a display device 210 (e.g., video, LED, LCD) and an alphanumeric input device 212 (e.g., a keypad, keyboard). In one embodiment, the display device 210 and the input device 212 may be incorporated as one unit as a touch screen display. The communication apparatus 200 may additionally include a mass storage device 216 (e.g., a drive unit), a signal generation device 218 (e.g., a speaker), a network interface device 220, and one or more sensors (e.g., GPS receiver, magnetometer, barometer, inertial sensor) 221. The network interface device 220 may include one or more radios (e.g., transmitters and receivers) coupled to one or more antennas in order to communicate over a wireless network channel 226 as illustrated in FIG. 1. The one or more radios may be configured to operate using one or more of the IEEE 802.11 standards.

The storage device 216 includes a computer-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the controller 202 during execution thereof by the communication apparatus 200, with the main memory 204, static memory 206, and the processor 202 also constituting computer-readable media.

While the computer-readable medium 222 is illustrated in an example embodiment to be a single medium, the term "computer-readable medium" may include a single medium or multiple media (e.g., a centralized or distributed database, and/or associated caches and servers) that store the one or more instructions 224.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

Figure 3:
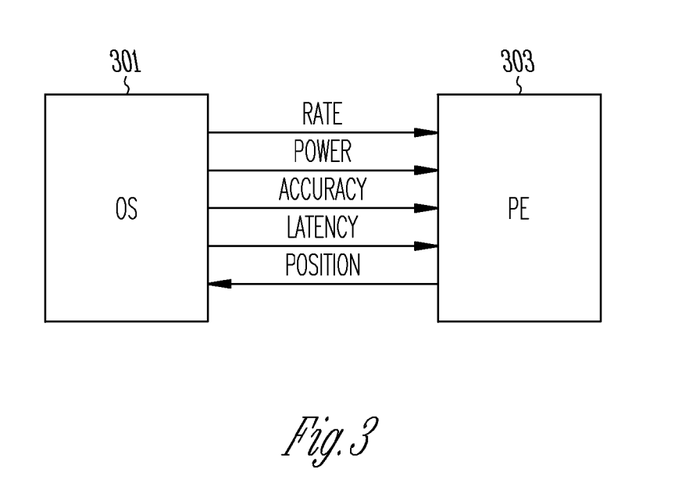
FIG. 3 illustrates a functional block diagram of an embodiment of an interface between an upper layer and a position provider in accordance with some embodiments.

FIG. 3 illustrates a functional block diagram of an embodiment of an interface between an upper layer (e.g., operating system) and a position provider (e.g., position engine, position estimation module). In an embodiment, the blocks 301, 303 may be one or more integrated circuits and/or modules. In another embodiment, the controller 202 of FIG. 2 may be configured to execute the function represented by the OS block 301 or by both the OS block 301 and the position engine block 303. Any of the memory of FIG. 2 may be configured to store these blocks as instructions 224.

For purposes of clarity and illustration, subsequent discussions refer to the upper layer as being the operating system (OS). However, the present embodiments are not limited to any one upper layer process.

The functional block diagram illustrates an application programming interface (API) (i.e., a set of protocols between applications) between the OS 301 and the position engine (PE) 303 (i.e., position algorithm). The OS 301 is configured to control the STA as well as provide an interface for a user to interact with the STA. The PE 303 is configured to interact with the OS 301 in order to estimate a position of the STA. The interaction between the OS 301 and the PE 303 may include the API as well as the results (e.g., estimated position) of the operation.

In the illustrated embodiment, the API between the OS 301 and the PE 303 includes a rate parameter, a power parameter, an accuracy parameter, and a selected position latency parameter. The OS 301 sends the position rate parameter to the PE 303 to instruct the PE 303 as to the time between two position reports from the PE 303 to the OS 301. The rate of reporting may affect the resolution of the trajectory. The OS 301 sends the power parameter to the PE 303 to instruct the PE to obtain a position estimate based on the power parameter. For example, the OS 301 may send one of the following parameters: high, low, none. The "high" parameter may instruct the PE 303 to obtain the best position estimate in any way it can (e.g., GPS only, GPS and WiFi) which would use a higher power. The "low" parameter would instruct the PE 303 to minimize it power usage in obtaining the position estimate (e.g., WiFi only). The "none" parameter would instruct the PE 303 to respond with the already obtained position estimate without additional measurements and without additional power usage.

The OS 301 sends the accuracy parameter to the position engine 303 to instruct the PE 303 as to what level of accuracy is desired. This parameter may be an indication of the accuracy as represented by a particular error distance (e.g., +/−meters) or a "high" accuracy or a "low" accuracy indication. The PE 303 may use this parameter in combination with the power parameter in determining when to use a WiFi trilateration method only, a GPS only method, or a combination of both GPS and WiFi.

Not all applications executed by the STA need the same accuracy or position update frequency for STA position. For example, a navigation application for a vehicle may need updated more often than an application to log a jogging route. Another application may need only a single position estimation. In the illustrated embodiment, the OS 301 sends the selected position latency parameter to the PE 303 so that the PE 303 knows what the restrictions are with respect to the timing of when to perform a position estimation after arriving at a location.

It should be noted that the position latency parameter is different from the rate parameter. The rate parameter indicates how often the PE 303 is to report the STA position (e.g., frequency of reporting the position) to the OS 301. The position latency parameter indicates a time period for estimating the STA position in relation to a time at a previous position. Thus, various combinations of these parameters may be used including high rate/high position latency, high rate/lo position latency, low rate/high position latency, and low rate/low position latency.

The API interface between the OS 301 and the PE 303 may include at least the four parameters (i.e., rate, power, accuracy, position latency) such that the PE 303 may now have multiple operational modes that combine all of these parameters. For example, these modes may include:

1. High accuracy, low latency;
2. Low power, low latency;
3. Balanced power and accuracy, low latency;
4. No power;
5. Highest accuracy, high latency;
6. High accuracy, high latency;
7. Low power, high latency;
8. Balanced power and accuracy, high latency for power;
9. Balanced power and accuracy, high latency for accuracy.

Selection of one or more of the modes by the upper layer (e.g., OS 301) may provide benefits over other modes. Typical conventional reporting for navigation or position indication on a map use minimal latency in order to report the STA position with minimal delay. Using minimal latency, the PE 303 estimates and reports to the OS only the present location. However, with the higher selected latency (e.g., modes 5, 6), the PE 303 has a longer time period over which to collect additional, previous measurements up to the present time and then report the result to the OS 301 at the designated time or every designated time period. The result may include the position of the STA prior to the present time and the length of time from the present time to the time that the STA was at that particular position.

If lower power operation by the STA is desired or necessary to conserve a reduced battery storage, mode 7 may provide lower power consumption as compared to, for example, mode 2. Since the position latency of mode 7 is longer than mode 2, fewer measurements may occur during the selected time period and, thus, the power consumption for performing the estimations is reduced.

Mode 8 may provide improved power consumption as compared to, for example, mode 3. Like mode 7, mode 8 also uses a higher latency and, thus, fewer measurements.

If greater accuracy with improved power consumption is desired, mode 9 may provide better accuracy as compared to, for example mode 3. As in previous examples, the higher latency may make more measurements available including measurements based on future position.

Figure 4:
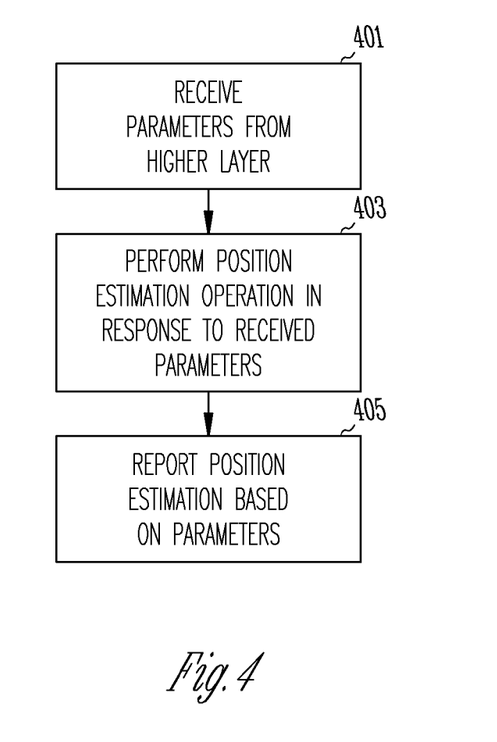
FIG. 4 illustrates a flowchart illustrating an embodiment of a method for selection of position latency during position estimation using ToF in accordance with some embodiments.

FIG. 4 illustrates a flowchart illustrating an embodiment of a method for selection of position latency during position estimation using ToF. This embodiment may be performed by the position provider (e.g., position engine).

At block 401, the position provider receives parameters from a higher layer (e.g., OS). As discussed previously, these parameters may include rate, power, accuracy, and position latency.

At block 403, the position provider performs a position estimation operation based on the received parameters. As discussed previously, the position estimation operation may be performed according to one or more of the above described modes, as selected by the combination of the parameters. Depending on the mode, the position estimation may be obtained using any of the above disclosed position estimation methods.

In block 405, the position estimation is reported to the requesting layer (e.g., OS) based on the received parameters. For example, the position latency parameter may indicate that the position estimation should be performed at a particular time after arriving at a particular position.

Figure 5:
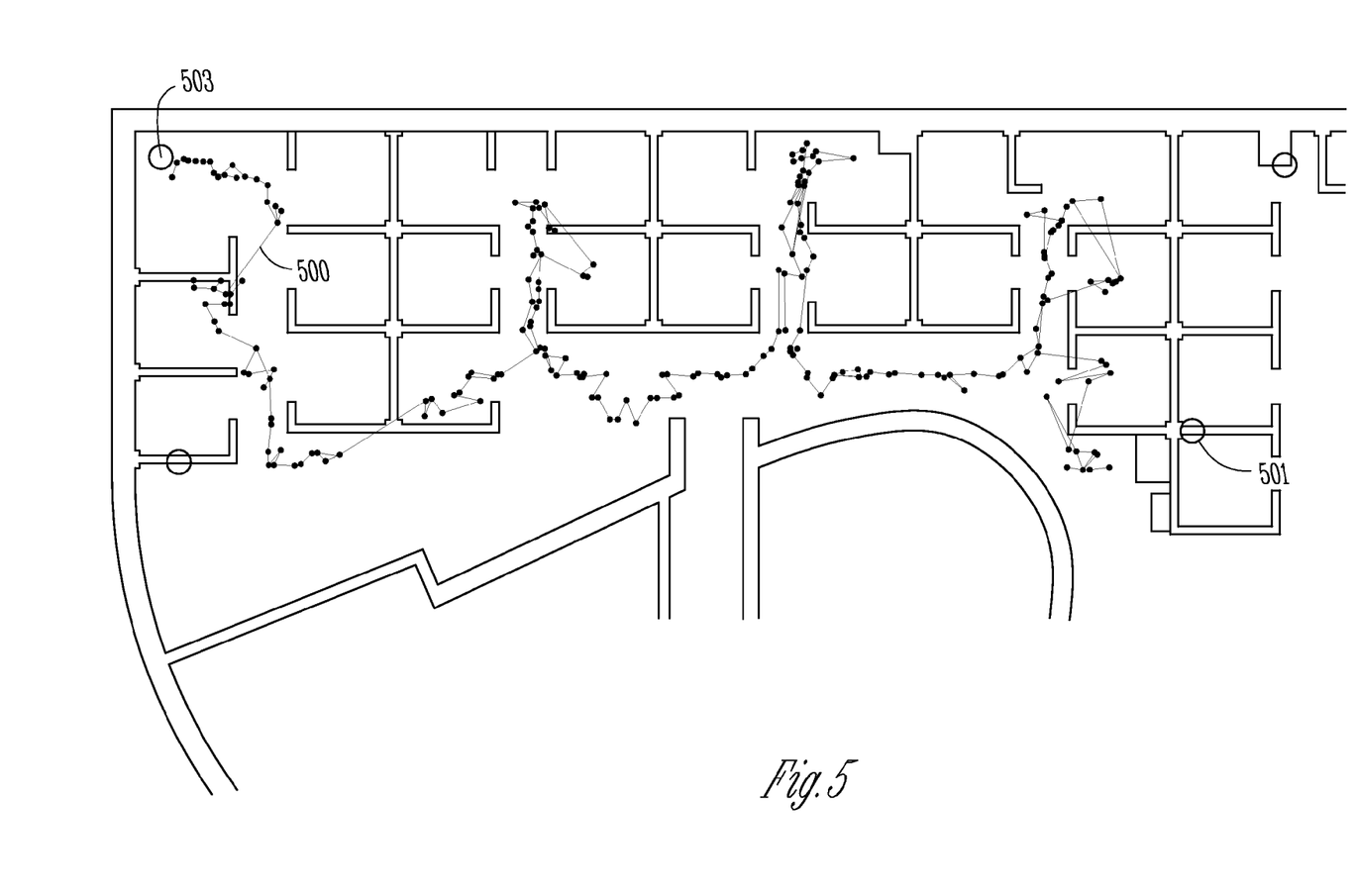
FIG. 5 illustrates a diagram of an embodiment of position estimation using a low position latency in accordance with the embodiment of FIG. 4.

FIG. 5 illustrates a diagram of an embodiment of position estimation using a low position latency in accordance with the embodiment of FIG. 4. A map of an office area with a plurality of cubicles or offices is shown with a STA.

This embodiment may use a network of WiFi APs, or some other wireless technology, to provide the ToF operations with a STA in order to estimate a position of the STA. In another embodiment, inertial sensors and map matching algorithms may be combined with the ToF operations to increase the accuracy of the estimations.

The STA is shown starting at a start position 501. The STA then move through the office area over a path 500 to a final position 503. It can be seen that the low latency results in an erratic path through various areas that may not be important to note to the requester of the information.

Figure 6:
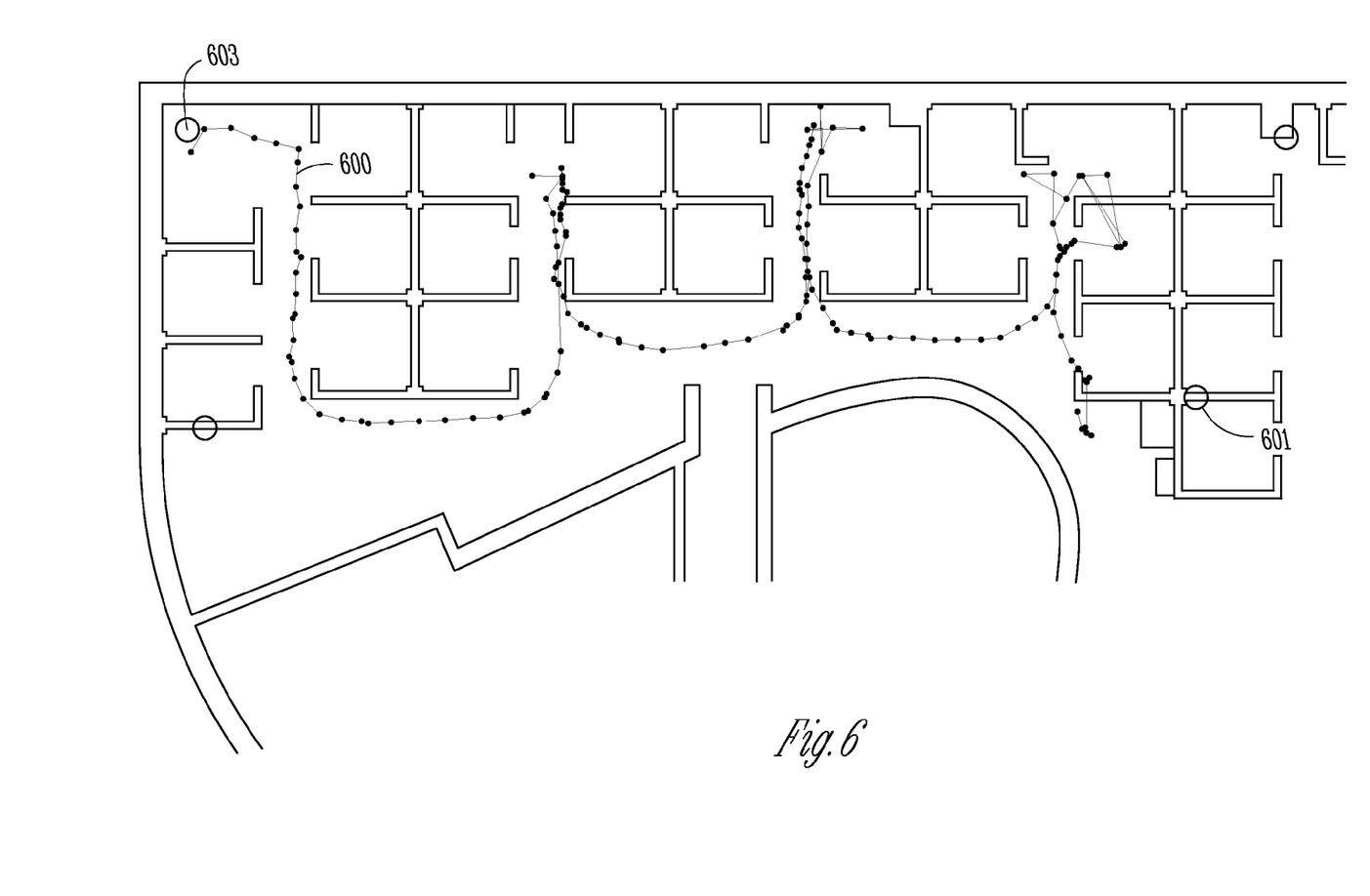
FIG. 6 illustrates a diagram of an embodiment of position estimation using a high position latency in accordance with the embodiment of FIG. 4.

FIG. 6 illustrates a diagram of an embodiment of position estimation using a high position latency in accordance with the embodiment of FIG. 4. The STA is also shown in this embodiment at a start position 601 and following a path 600 through the office area to a final position 603. It can be seen that the high latency results in a smoother path 600 than using a lower latency.

In another example of operation of the method of FIG. 4, a user may be walking with a STA through an urban canyon where satellite reception is unlikely to allow adequate position reporting. In such an embodiment, the STA may use a trilateration operation to estimate its position based on ToF operations with wireless system APs. In such an embodiment, a geo-fencing may be used to define a virtual fence around the user's favorite coffee shop such that an alarm is generated when the STA is within that virtually fenced area. While walking a few blocks from the coffee shop, the user may receive a false alarm due to an inaccurate estimation. By increasing the position latency, such an outlier position may be filtered from being reported. Moreover, by instructing the position provider to use the increased latency, such outlier positions may not even be calculated.

In yet another example of operation of the method of FIG. 4, a secured access embodiment, such as Enterprise Right Management (ERM), may be improved by increased position latency. In such an embodiment, it is important to verify a STA position at the secured location prior to giving the requested rights to the user. Position latency may be applied to increase the confidence in the position. Such an embodiment may use the "highest accuracy, high latency" mode discussed previously.

In yet another example of operation of the method of FIG. 4, a position analytics embodiment may be improved by collecting information that is not sensitive to latency. A large amount of position data may be gathered by monitoring the position of the STA through a particular time period. By smoothing the position data with a high latency, position accuracy may be increased at the expense of latency. For example, a store may gather location information from all of its customers in order to determine the time spent in particular parts of the store. The store may then adjust its layout or try different sales tactics.

In yet another example of operation of the method of FIG. 4, the unsmoothed position data may be stored when performing one of the above-described smoothing operations as a result of the high position latency. There is no need to store two different states for the position provider so, when calculating a high latency position, the low latency position data is also generated with no additional work. For example, if a position with five seconds latency is calculated, the positions with 4, 3, 2, 1, and 0 seconds latency are also generated.

EXAMPLES

The following examples pertain to further embodiments.

Example 1 is a mobile communication station (STA) for operation in a wireless network having access points (APs), the STA having hardware processing circuitry including logic configured to perform position estimation operations with respect to the APs based on a position latency parameter, the circuitry including a position estimation module to estimate a prior STA position at a time delay indicated by the latency parameter, wherein the time delay is a time period from a present time to a previous time that the STA was at that particular position.

In Example 2, the subject matter of Example 1 can optionally include an upper layer and a position provider wherein the upper layer is configured to provide a rate parameter, a power parameter, an accuracy parameter, and the position latency parameter to the position provider.

In Example 3, the subject matter of Examples 1-2 can optionally include wherein the upper layer is an operating system and the position provider is a position engine.

In Example 4, the subject matter of Examples 1-3 can optionally include wherein the position engine is further configured to report position estimation results to the operating system in response to the position latency parameter such that the position estimation results comprise the prior position of the STA prior to a present time and the time delay from the present time to a time that the STA was at that particular position.

In Example 5, the subject matter of Examples 1-4 can optionally include memory configured to store map data including street maps and indoor maps.

In Example 6, the subject matter of Examples 1-5 can optionally include wherein the position estimation module is configured to estimate the STA position at a rate determined by a rate parameter from an operating system.

In Example 7, the subject matter of Examples 1-6 can optionally include wherein the position estimation module is configured to estimate the STA position based on the position latency parameter that is configured to represent a time period between a first time that the STA arrives at a prior position and a second time when the STA performs a calculation to estimate its position.

In Example 8, the subject matter of Examples 1-7 can optionally include at least one radio.

In Example 9, the subject matter of Examples 1-8 can optionally include at least one antenna coupled to the at least one radio.

In Example 10, the subject matter of Examples 1-9 can optionally include wherein the at least one radio is configured to operate over one or more wireless channels using an IEEE 802.11 standard.

In Example 11, the subject matter of Examples 1-10 can optionally include wherein the position estimation module is further configured to estimate the position of the STA using time-of-flight (ToF) calculations.

In Example 12, the subject matter of Examples 1-11 can optionally include a position engine configured to use the at least one radio, a GPS receiver, a magnetometer, an inertial sensor, a barometer, and/or map data to estimate the prior STA position based on a rate parameter, a power parameter, an accuracy parameter, and the position latency parameter.

Example 13 is a method for position estimation of a mobile communication station (STA) with respect to access points (APs), the method comprising: receiving a position latency parameter; and performing a position estimation operation, with respect to the APs, based on the position latency parameter.

In Example 14, the subject matter of Example 13 can optionally include wherein receiving the position latency parameter comprises a position provider receiving the position latency parameter and further comprising the position provider reporting the position estimation to an upper layer of the STA.

In Example 15, the subject matter of Examples 13-14 can optionally include receiving a power parameter and an accuracy parameter; and performing the position estimation operation in response to the power parameter, the accuracy parameter, and the position latency parameter.

In Example 16, the subject matter of Examples 13-15 can optionally include performing the position estimation operation comprises performing a WiFi trilateration and/or performing a global positioning system (GPS) position estimation.

Example 17 is a non-transitory computer-readable storage medium that stores instructions for execution by processing circuitry of a mobile communication station (STA) to perform operations to estimate a location with respect to access points (APs), the operations to configure an initiating station to: perform a position estimation operation, with respect to the APs, based on a position latency parameter.

In Example 18, the subject matter of Example 17 can optionally include wherein the operations further perform the position estimation operation based on the position latency parameter, a power parameter and an accuracy parameter.

In Example 19, the subject matter of Examples 17-18 can optionally include wherein the operations further perform one of a plurality of modes based on the position estimation, power, and accuracy parameters, the plurality of modes comprising: high accuracy, low latency, low power, low latency, balanced power and accuracy, low latency, no power, high accuracy, high latency, low power, high latency, balanced power and accuracy, high latency for power, or balanced power and accuracy, high latency for accuracy.

In Example 20, the subject matter of Examples 17-19 can optionally include wherein the operations further perform the position estimation operation based on a predetermined time to perform the position estimation operation or a predetermined frequency for performing the position estimation operation as indicated by the position latency parameter.

The Abstract will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A mobile communication station (STA) for operation in a wireless network having access points (APs), the STA having hardware processing circuitry including logic configured to perform position estimation operations with respect to the APs based on a position latency parameter, the circuitry including a position estimation circuit to receive the position latency parameter in order to estimate a prior STA position at a time delay indicated by the latency parameter, wherein the time delay is a time period from a present time to a previous time that the STA was at that particular position, wherein the position estimation circuit further reports the prior STA position estimation to an upper layer of the STA.

2. The STA of claim 1, further comprising the upper layer configured to provide a rate parameter, a power parameter, an accuracy parameter, and the position latency parameter to the position estimation circuit.

3. The STA of claim 2, wherein the upper layer is an operating system.

4. The STA of claim 1, further comprising memory configured to store map data including street maps and indoor maps.

5. The STA of claim 4, wherein the position estimation circuit is configured to estimate the STA position at a rate determined by a rate parameter from an operating system.

6. The STA of claim 1, further comprising at least one radio.

7. The STA of claim 6, wherein the at least one radio is configured to operate over a cellular network.

8. The STA of claim 6, further comprising at least one antenna coupled to the at least one radio.

9. The STA of claim 6, wherein the at least one radio is configured to operate over one or more wireless channels using an Institute of Electrical and Electronics Engineers (IEEE) 802.11 standard.

10. The STA of claim 6, wherein the position estimation circuit is further configured to estimate the position of the STA using time-of-flight (ToF) calculations.

11. The STA of claim 6, wherein the position estimation circuit is further configured to use the at least one radio, a GPS receiver, a magnetometer, an inertial sensor, a barometer, and/or map data to estimate the prior STA position based on a rate parameter, a power parameter, an accuracy parameter, and the position latency parameter.

12. A method for position estimation of a mobile communication station (STA) with respect to access points (APs), the method comprising:
receiving a position latency parameter by a position provider;
performing a position estimation operation, with respect to the APs, based on the position latency parameter; and
reporting, by the position provider, the position estimation to an upper layer of the STA.

13. The method of claim 12, further comprising:
receiving a power parameter, a rate parameter, and an accuracy parameter; and
performing the position estimation operation in response to the power parameter, the rate parameter, the accuracy parameter, and the position latency parameter.

14. The method of claim 12, wherein performing the position estimation operation comprises performing a WiFi trilateration and/or performing a global positioning system (GPS) position estimation.

15. A non-transitory computer-readable storage medium that stores instructions for execution by processing circuitry of a mobile communication station (STA) to perform operations to estimate a location with respect to access points (APs), the operations to configure an initiating station to:
perform a position estimation operation, with respect to the APs, based on a position latency parameter that is provided to a position provider; and
report the location estimate, by the position provider, to an upper layer of the STA.

16. The non-transitory computer-readable storage medium of claim 15 wherein the operations further perform the position estimation operation based on the position latency parameter, a rate parameter, a power parameter and an accuracy parameter.

17. The non-transitory computer-readable storage medium of claim 16 wherein the operations further perform one of a plurality of triodes based on the position estimation, power, and accuracy parameters, the plurality of modes comprising: high accuracy, low latency, low power, low latency, balanced power and accuracy, low latency, no power, high accuracy, high latency, low power, high latency, balanced power and accuracy, high latency for power, or balanced power and accuracy, high latency for accuracy.

18. The non-transitory computer-readable storage medium of claim 15 wherein the operations further perform the position estimation operation based on a predetermined time to perform the position estimation operation or a predetermined frequency for performing the position estimation operation as indicated by the position latency parameter.

* * * * *